(12) United States Patent
Rieke et al.

(10) Patent No.: US 10,356,121 B2
(45) Date of Patent: *Jul. 16, 2019

(54) SYSTEMS AND METHODS FOR DYNAMIC NETWORK SECURITY CONTROL AND CONFIGURATION

(71) Applicant: Catbird Networks, Inc., Scotts Valley, CA (US)

(72) Inventors: Malcolm Rieke, Santa Cruz, CA (US); James Sebastian Dennis, Scotts Valley, CA (US); Michael Berman, Scotts Valley, CA (US)

(73) Assignee: CATBIRD NETWORKS, INC., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,954

(22) Filed: Aug. 15, 2017

(65) Prior Publication Data

US 2018/0020019 A1 Jan. 18, 2018

Related U.S. Application Data

(63) Continuation of application No. 15/336,691, filed on Oct. 27, 2016, now Pat. No. 9,749,351, which is a
(Continued)

(51) Int. Cl.
*G08B 23/00* (2006.01)
*H04L 29/06* (2006.01)
(Continued)

(52) U.S. Cl.
CPC ...... *H04L 63/1433* (2013.01); *G06F 9/45558* (2013.01); *G06F 16/951* (2019.01);
(Continued)

(58) Field of Classification Search
USPC ........................ 726/25, 22–24; 713/188, 189
See application file for complete search history.

(56) References Cited

U.S. PATENT DOCUMENTS

| | | |
|---|---|---|
| 5,657,470 A | 8/1997 | Fisherman et al. |
| 6,278,694 B1 | 8/2001 | Wolf et al. |

(Continued)

FOREIGN PATENT DOCUMENTS

| | | |
|---|---|---|
| EP | 0973350 | 1/2000 |
| EP | 2753069 | 7/2014 |

(Continued)

OTHER PUBLICATIONS

Title: Systems and Methods for Dynamic Network Security Control and Configuration U.S. Appl. No. 13/918,633, filed Jun. 14, 2013 Inventor(s): Malcolm Rieke, et al U.S. Pat. No. 9,088,541 Issue Date: Jul. 21, 2015.

(Continued)

*Primary Examiner* — Amare F Tabor
(74) *Attorney, Agent, or Firm* — Greenberg Traurig, LLP

(57) ABSTRACT

A computer-implemented method according to one embodiment of the present disclosure includes identifying, by a computer system, an asset associated with a group; detecting a change in an attribute of the asset; and in response to detecting the change in the attribute of the asset, modifying, by the computer system, a configuration setting for a firewall. Among other things, the embodiments of the present disclosure can perform dynamically configure and control security features in response to changes in the computing environment, including asset attribute changes, security events, operational events, user input and environmental changes. Embodiments of the present disclosure thereby help to quickly maintain or change the security posture of a
(Continued)

system and maintain the level of compliance with set of predefined security benchmarks or codified best practices.

17 Claims, 8 Drawing Sheets

Related U.S. Application Data continuation of application No. 14/727,623, filed on Jun. 1, 2015, now Pat. No. 9,509,660, which is a continuation of application No. 13/918,633, filed on Jun. 14, 2013, now Pat. No. 9,088,541.

(60) Provisional application No. 61/830,003, filed on May 31, 2013.

(51) Int. Cl.
  *G06F 16/951* (2019.01)
  *G06F 9/455* (2018.01)

(52) U.S. Cl.
  CPC .......... *H04L 63/02* (2013.01); *H04L 63/0227* (2013.01); *H04L 63/0236* (2013.01); *H04L 63/0263* (2013.01); *H04L 63/20* (2013.01); *G06F 2009/45587* (2013.01)

(56) References Cited

U.S. PATENT DOCUMENTS

| | | | |
|---|---|---|---|
| 7,668,925 B1 | 2/2010 | Liao et al. | |
| 7,711,979 B2 | 5/2010 | Salli | |
| 7,779,226 B2 | 8/2010 | Kita | |
| 7,849,497 B1 | 12/2010 | Hurst et al. | |
| 7,886,351 B2 | 2/2011 | Dadhia et al. | |
| 8,116,226 B1 | 2/2012 | Liao et al. | |
| 8,166,554 B2 | 4/2012 | John | |
| 8,205,035 B2 | 6/2012 | Reddy et al. | |
| 8,214,889 B2 | 7/2012 | Bahl et al. | |
| 8,261,317 B2 * | 9/2012 | Litvin | H04L 63/0263 370/230 |
| 8,321,944 B1 | 11/2012 | Mayer et al. | |
| 8,478,723 B2 | 7/2013 | Rousseau | |
| 8,516,241 B2 * | 8/2013 | Chang | H04L 63/0218 713/151 |
| 8,713,631 B1 * | 4/2014 | Pavlyushchik | G06F 21/566 726/1 |
| 8,832,835 B1 | 9/2014 | Chen et al. | |
| 9,009,319 B2 | 4/2015 | Carlin et al. | |
| 9,049,105 B1 | 6/2015 | Feinstein et al. | |
| 9,088,541 B2 | 7/2015 | Rieke et al. | |
| 9,189,395 B2 | 11/2015 | Na | |
| 9,195,484 B1 | 11/2015 | Ward, Jr. | |
| 9,389,898 B2 * | 7/2016 | Barak | G06F 9/45558 |
| 9,485,279 B2 | 11/2016 | Kimer et al. | |
| 9,509,574 B2 | 11/2016 | Kirner et al. | |
| 9,509,660 B2 | 11/2016 | Rieke et al. | |
| 9,553,768 B2 | 1/2017 | Scott et al. | |
| 9,749,351 B2 | 8/2017 | Rieke et al. | |
| 9,769,174 B2 | 9/2017 | Rieke et al. | |
| 9,912,549 B2 | 3/2018 | Rieke | |
| 9,923,909 B2 | 3/2018 | Lietz et al. | |
| 10,205,736 B2 | 2/2019 | Rieke et al. | |
| 2003/0220940 A1 | 11/2003 | Futoransky et al. | |
| 2004/0075675 A1 | 4/2004 | Raivisto et al. | |
| 2004/0078105 A1 | 4/2004 | Moon et al. | |
| 2004/0243707 A1 | 12/2004 | Watkinson | |
| 2004/0255269 A1 | 12/2004 | Santori et al. | |
| 2005/0050351 A1 | 3/2005 | Cain | |
| 2005/0125389 A1 | 6/2005 | Hazzard et al. | |
| 2005/0138413 A1 | 6/2005 | Lippmann et al. | |
| 2005/0193430 A1 | 9/2005 | Cohen et al. | |
| 2005/0223092 A1 | 10/2005 | Sapiro et al. | |
| 2005/0268335 A1 | 12/2005 | Le et al. | |
| 2006/0021034 A1 | 1/2006 | Cook | |
| 2006/0041936 A1 | 2/2006 | Anderson et al. | |
| 2006/0242322 A1 | 10/2006 | Williams et al. | |
| 2007/0118909 A1 | 5/2007 | Hertzog et al. | |
| 2007/0143827 A1 | 6/2007 | Nicodemus et al. | |
| 2008/0005784 A1 | 1/2008 | Miliefsky | |
| 2008/0134286 A1 | 6/2008 | Amdur et al. | |
| 2008/0201458 A1 | 8/2008 | Salli | |
| 2008/0270606 A1 | 10/2008 | Gooch et al. | |
| 2008/0301765 A1 | 12/2008 | Nicol et al. | |
| 2009/0007269 A1 | 1/2009 | Bianco | |
| 2009/0199298 A1 | 8/2009 | Miliefsky | |
| 2009/0267946 A1 | 10/2009 | Agutter et al. | |
| 2009/0288135 A1 | 11/2009 | Chang et al. | |
| 2009/0327903 A1 | 12/2009 | Smith et al. | |
| 2010/0043067 A1 | 2/2010 | Varadhan et al. | |
| 2010/0057667 A1 | 3/2010 | Gotoh et al. | |
| 2010/0138925 A1 | 6/2010 | Barai et al. | |
| 2010/0257580 A1 | 10/2010 | Zhao | |
| 2010/0333165 A1 | 12/2010 | Basak et al. | |
| 2011/0126288 A1 | 5/2011 | Schloegel et al. | |
| 2011/0197278 A1 | 8/2011 | Chow et al. | |
| 2011/0202847 A1 | 8/2011 | Dimitrov | |
| 2011/0277034 A1 | 11/2011 | Hanson | |
| 2012/0260331 A1 | 10/2012 | Aaron | |
| 2013/0019277 A1 | 1/2013 | Chang et al. | |
| 2013/0067044 A1 | 3/2013 | Levy-Yurista et al. | |
| 2013/0097662 A1 | 4/2013 | Pearcy et al. | |
| 2013/0276053 A1 | 10/2013 | Hugard, IV et al. | |
| 2013/0347068 A1 | 12/2013 | Elleboe et al. | |
| 2014/0109168 A1 | 4/2014 | Ashley et al. | |
| 2014/0122669 A1 | 5/2014 | Ennis, Jr. et al. | |
| 2014/0165204 A1 | 6/2014 | Williams et al. | |
| 2014/0165207 A1 | 6/2014 | Engel et al. | |
| 2014/0173742 A1 | 6/2014 | Gluck et al. | |
| 2014/0213371 A1 | 7/2014 | Jain | |
| 2014/0215630 A1 | 7/2014 | Raz et al. | |
| 2014/0317677 A1 * | 10/2014 | Vaidya | H04L 63/20 726/1 |
| 2014/0351415 A1 | 11/2014 | Harrigan et al. | |
| 2014/0359749 A1 | 12/2014 | Rieke et al. | |
| 2015/0149611 A1 | 5/2015 | Lissack | |
| 2015/0244594 A1 | 8/2015 | Kay | |
| 2015/0264012 A1 | 9/2015 | Rieke et al. | |
| 2015/0295948 A1 | 10/2015 | Hassell et al. | |
| 2016/0072815 A1 | 3/2016 | Rieke et al. | |
| 2016/0072831 A1 | 3/2016 | Rieke | |
| 2016/0205002 A1 | 7/2016 | Rieke et al. | |
| 2016/0241595 A1 | 8/2016 | Molloy et al. | |
| 2017/0048268 A1 | 2/2017 | Rieke et al. | |
| 2018/0069865 A1 | 3/2018 | Rieke et al. | |
| 2018/0191578 A1 | 7/2018 | Rieke | |
| 2018/0248899 A1 | 8/2018 | Rieke | |
| 2018/0248901 A1 | 8/2018 | Rieke | |

FOREIGN PATENT DOCUMENTS

| | | |
|---|---|---|
| WO | 2007005638 | 11/2007 |
| WO | 2016036485 | 3/2016 |

OTHER PUBLICATIONS

Title: Systems and Methods for Dynamic Network Security Control and Configuration U.S. Appl. No. 14/727,623, filed Jun. 1, 2015 Inventor(s): Malcolm Rieke, et al U.S. Pat. No. 9,509,660 Issue Date: Nov. 29, 2016.
Title: Systems and Methods for Dynamic Network Security Control and Configuration U.S. Appl. No. 15/336,691, filed Oct. 27, 2016 Inventor(s): Malcolm Rieke, et al U.S. Pat. No. 9,749,351 Issue Date: Aug. 29, 2017.
Title: Systems and Methods for Network Analysis and Reporting U.S. Appl. No. 14/523,624, filed Oct. 24, 2014 Inventor(s): Malcolm Rieke U.S. Pat. No. 9,912,549 Issue Date: Mar. 6, 2018.
Title: Systems and Methods for Network Analysis and Reporting U.S. Appl. No. 15/910,862, filed Mar. 2, 2018 Inventor(s): Malcolm Rieke Non Final Action Mailed Status Date: May 16, 2018.

(56) References Cited

OTHER PUBLICATIONS

Title: Systems and Methods for Creating and Modifying Access Control Lists U.S. Appl. No. 14/821,103, filed Aug. 7, 2015 Inventor(s): Malcolm Rieke, et al U.S. Pat. No. 9,769,174 Issue Date: Sep. 19, 2017.
Title: Systems and Methods for Creating and Modifying Access Control Lists U.S. Appl. No. 15/707,989, filed Sep. 18, 2017 Inventor(s): Malcolm Rieke, et al Response to Non-Final Office Action Entered and Forwarded to Examiner Status Date: Apr. 8, 2018.
Title: Systems and Methods for Network Data Flow Aggregation U.S. Appl. No. 14/974,378, filed Dec. 18, 2015 Inventor(s): Malcolm Rieke, et al Status: Final Rejetion Mailed Status Date: Mar. 20, 2018.
Title: Behavioral Baselining of Network Systems U.S. Appl. No. 15/443,857, filed Feb. 27, 2017 Inventor(s): Malcolm Rieke Status: Docketed New Case—Ready for Examination Status Date: Aug. 7, 2017.
Title: Behavioral Baselining of Network Systems U.S. Appl. No. 15/667,526, filed Aug. 2, 2017 Inventor(s): Malcolm Rieke Status: Docketed New Case—Ready for Examination Status Date: Jan. 30, 2018.
International Application No. PCT/US2017/038024, International Search Report and Written Opinion, dated Nov. 15, 2017.
Fangfang Zhou, Ronghua Shi, Ying Zhao, Yezi Huang, Xing Liang; NetSecRadar—A Visualization System for Network Security Situational Awareness, Cyberspace Safety and Security Symposium 2013, p. 403-416, LNCS (Nov. 13-15, 2013).
H. Shiravi, A. Shiravi and A. A. Ghorbani, "A Survey of Visualization Systems for Network Security," in IEEE Transactions on Visualization and Computer Graphics, vol. 18, No. 8, pp. 1313-1329 (Aug. 23, 2011).
Harrison et al., NV: Vulnerability Visualization for the Web. VizSec '12 Proceedings of the Ninth International Symposium on Visualization for Cyber Security, pp. 25-32 [retrieved on Apr. 27, 2017]. Retrieved from the Internet: <URL: http: // di .acm .org/citation. cfm?id=2379694 >.
International Patent Application PCT/US2015/044865, International Search Report and Written Opinion, dated Dec. 21, 2015.
International Patent Application PCT/US2015/047964, International Search Report and Written Opinion, dated Dec. 11, 2015.
European Patent Application 15838627.6, Extended Search Report, dated Jul. 12, 2018.
Extended European Search Report, EP Application No. 15838576.5, dated Jun. 20, 2018.
Russian Patent Application 2017127710, Search Report, dated Jul. 11, 2018.
PosgreSQL Global Develepment Group, "PostgreSQL 8.4.22 Documentation", 2014, p. 71-75 (Year: 2014).
StackExchange, "Bulk loading to partition table", Oct. 2013, https:// dba.stackexchange.com/questions/51793/bulk-loading-to-partitioned-table (Year: 2013).
Zhou et al., "NetSecRadar: A Visualization System for Network Security Situational Awareness", 2013, Springer International Publishing Switzerland, p. 401-416 (Year: 2013).

\* cited by examiner

SYSTEMS AND METHODS FOR DYNAMIC NETWORK SECURITY CONTROL AND CONFIGURATION

CROSS-REFERENCE TO RELATED APPLICATIONS

The present application is a continuation application of U.S. patent application Ser. No. 15/336,691, filed Oct. 27, 2016, and entitled "SYSTEMS AND METHODS FOR DYNAMIC NETWORK SECURITY CONTROL AND CONFIGURATION," which is a continuation application of U.S. patent application Ser. No. 14/727,623, filed Jun. 1, 2015, issued at U.S. Pat. No. 9,509,660 on Nov. 29, 2016 and entitled "SYSTEMS AND METHODS FOR DYNAMIC NETWORK SECURITY CONTROL AND CONFIGURATION," which is a continuation application of U.S. patent application Ser. No. 13/918,633, filed Jun. 14, 2013, issued as U.S. Pat. No. 9,088,541 on Jul. 21, 2015, and entitled "SYSTEMS AND METHODS FOR DYNAMIC NETWORK SECURITY CONTROL AND CONFIGURATION", which claims priority to U.S. Provisional Patent Application No. 61/830,003, filed May 31, 2013, entitled "SYSTEMS AND METHODS FOR DYNAMIC NETWORK SECURITY CONTROL AND CONFIGURATION", the entire disclosures of which applications are hereby incorporated by reference.

BACKGROUND

Exemplary embodiments described herein relate to systems and methods for network security control, and more particularly to controlling and configuring security components in a dynamically changing computing environment.

Information security architects and security operators, as well as governance, risk and compliance (GRC) personnel all face various challenges with respect to validating that security technical controls are in place and functioning for an asset or a group of assets within the corporate computing environment. Such challenges can be particularly difficult in distributed computing, virtualized computing systems, or "cloud computing" systems, where the components and environment of such systems may change frequently and rapidly.

Embodiments of the present disclosure help to address such challenges.

SUMMARY

Among other things, the embodiments of the present disclosure can dynamically configure and control security features in response to changes in the computing environment, including asset attribute changes, security events, operational events, user input and environmental changes. Embodiments of the present disclosure thereby help to quickly maintain or change the security posture of a system and maintain the level of compliance with a set of predefined security benchmarks or codified best practices.

A computer-implemented method according to one embodiment of the present disclosure includes identifying, by a computer system, an asset associated with a logical zone; detecting a change in an attribute of the asset; and in response to detecting the change in the attribute of the asset, modifying, by the computer system, a configuration setting for a firewall.

The present disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

A more complete understanding of certain embodiments may be derived by referring to the detailed description and claims when considered in connection with the following illustrative figures.

DETAILED DESCRIPTION OF EXEMPLARY EMBODIMENTS

Figure 1:
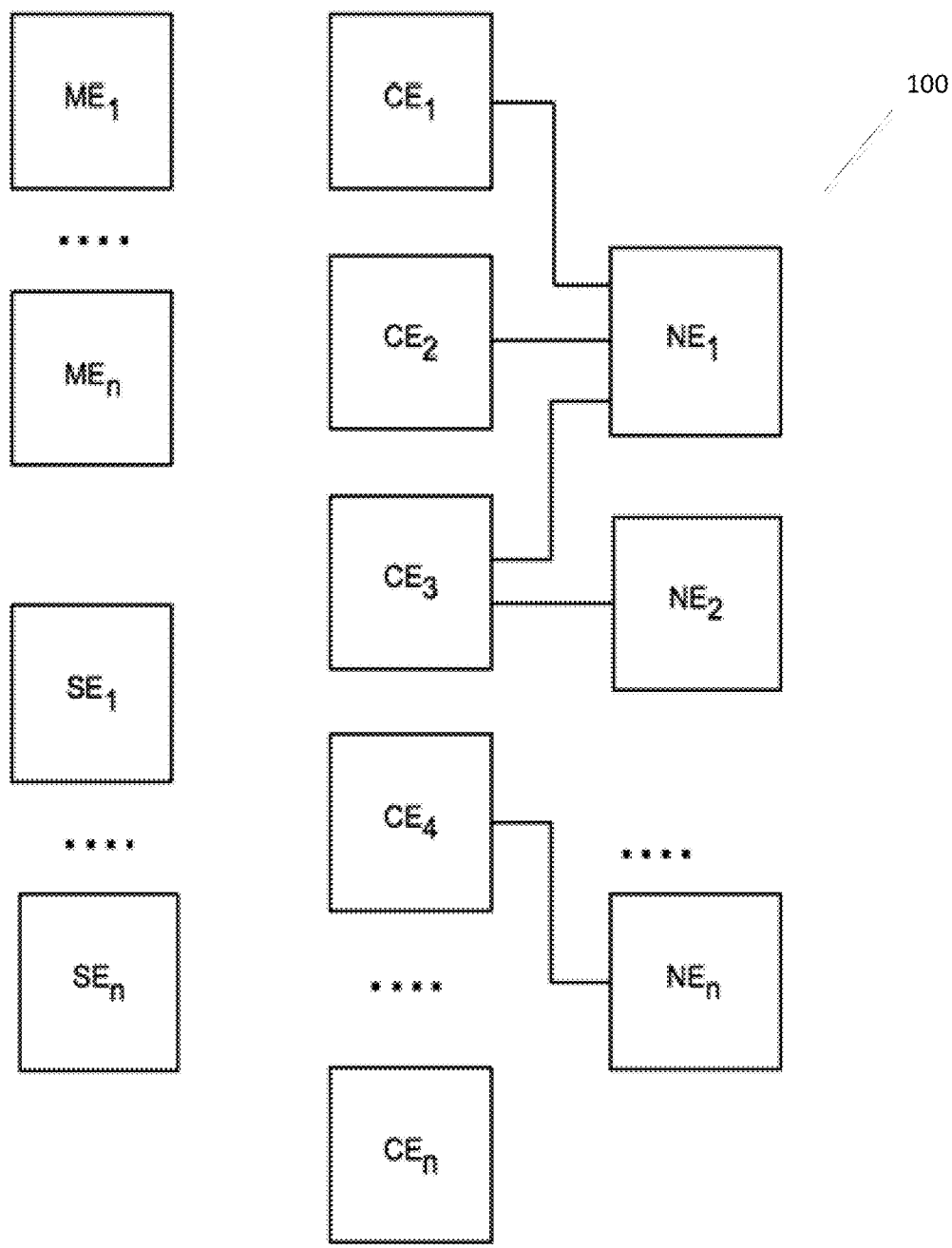
FIG. 1 depicts an exemplary computing environment that may be used in conjunction with various embodiments of the present disclosure.

Systems, methods and computer program products are provided. In the detailed description herein, references to "various embodiments", "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present disclosure may reference the following terms defined in the list below. The definitions in this list are exemplary only. Changes, modifications, and variations based on different definitions of the terms, as well as different terms, are intended to be included within the scope of the present disclosure.

Asset—a discrete hardware based on virtualized computing system that processes data in the data center, a virtualized computer or virtual machine. Assets may become a member of a TrustZone either through automated methods as expressed in membership polices or manually through a user action.

Asset attribute—a property of an asset including but not limited to any operating system configuration setting, data processing application deployed on the asset, application configuration setting, hardware based or virtualized system component including network interface, memory, disk, networking component interconnection, unique identifier, name, or any discrete data component or label associated with an asset, an asset configuration, or the asset's position within the physical or virtualized datacenter system.

Security technical control—a device or technology or a configuration or attribute of an element that performs a security function or changes the security posture or state of an element including but not limited to: firewalling, intrusion detection and prevention, vulnerability scanning, vulnerability management and mitigation, anti-malware, host based intrusion detection and prevention, file integrity monitoring, authentication-authorization-auditing, encryption in motion, encryption at rest, encryption key and token management, user entitlement management, network access control, password length specification, configuration settings that dictate the operation of a system or element in one or another context of various security levels.

Policy—a policy is a rule, set of rules, and or set of data used to guide the operation or behavior of a system or system component/element. Specifically a body of data associated with a security technical control that dictates the behavior and function of that control.

Logical zone—an arbitrary grouping of assets that may or may not have common attributes associated with a set of policies.

Hypervisor—a piece of computer software, firmware or hardware that creates and runs virtual machines.

Virtual Switch—a piece of software that provides for the network interconnection of virtual machines on a hypervisor.

Firewall—a software or hardware based security technical control that controls network traffic passing through it by analyzing the traffic components (packets) and making a decision to pass or block the traffic based on a set of rules.

Intrusion Prevention System (IPS)—a software or hardware based security technical control that inspects network connections for the purpose of detecting and disrupting undesirable network traffic based on signatures or behavior modeling.

Vulnerability Scanner—a software or hardware based security technical control that assesses the vulnerability state of assets on the network through the process of connecting to the asset over the network and assessing the asset based on known vulnerability signatures or indicators.

Compliance Framework—a structured set of guidelines, processes and procedures published for the purpose of defining accordance with established regulations, specifications, or legislation.

Catbird TrustZone—a logical zoning construct consisting of collection of policies that include control configuration policies, membership policies, and a collection of methods that implement dynamic control reconfiguration in response to changes in the computing environment.

GRC—Governance Risk and Compliance, a generalize grouping of three related functions within an organization that respectively deal with corporate governance, enterprise risk management (ERM) and corporate compliance with applicable laws and regulation.

Embodiments of the present disclosure may monitor all asset attribute changes (i.e., those assets within or outside of a TrustZone), computing environment changes, network component changes, security control events, management component events, asset events, and/or network events. Such events, which may be referred to collectively as "environmental events" herein, can be monitored within the context of all control configuration policies such that any control configuration policy can be dynamically modified to assure that the control is still in effect for any asset in a respective TrustZone.

Environmental events within the context of TrustZone members and membership policy can be monitored such that different sets of security control policies may be dynamically assigned to, or changed for, any asset in a TrustZone by moving the asset from one TrustZone to another or by changing a policy or policies for a TrustZone of which that asset is a member. Such changes may be applied to multiple assets by simultaneously performing the same move action on multiple assets, particularly in the case of a TrustZone membership change.

Referring now to FIG. 1, an exemplary computing environment 100 that may operate in conjunction with embodiments of the present disclosure is depicted. The components of environment 100 may be implemented using any desired combination of hardware and software components, and may be hosted by, for example, host computing system 810 depicted in FIG. 8. Alternatively, or additionally, system 800 (or any portion thereof) may be included in environment 100. In the example shown in FIG. 1, the environment 100 includes four different types of components: computing elements (CE), networking elements (NE), management elements (ME), and security elements (SE). Embodiments of the present disclosure may interact with any number of such components, as well as other components. Each individual component may represent computers or virtual machines including any desired physical or virtualized hardware computing resources, such as processors, memories, switches, routers, load balancers, operating systems, software applications, and/or configuration elements (files, processes, policies, programs). Any element or derivative thereof depicted in FIG. 1 may be implemented using any desired combination of physical and virtual components. Virtualized elements may be bound to physical hardware using any desired hypervisor software, such as VMware ESXi, Microsoft Hyper-V, and/or OpenStack.

Computing elements are characterized by their function as application platforms dedicated to the processing of data and to providing computer services in the form of applications to a user population of various privilege levels. One example of a computing element may include a physical or virtualized Microsoft Windows server or Linux server running an application.

Network elements are characterized by their function of providing for the interconnectivity (in part or in whole) of various elements within the computing environment with networking technology and protocols and to providing for the transportation of data between computing environment elements. Examples of network elements may include routers, switches, virtualized switches, networks, VLANs, and/or software defined networking components including virtual extensible LANs (VXLANS).

Management elements are characterized by their function as hosting applications that are dedicated to the management and operation of the computing environment, the processing of data, and providing management and operational services in the form of management and operation applications to a user population of privileged administrative users. Management elements may manage other elements including computing elements, network elements or other management elements. One example of a management element may include a Microsoft Windows server running VMware vSphere Server software that is managing hypervisors in the computing environment.

Security elements are characterized by their function of providing implementations of various technical security controls either at the network, host, virtual machine, asset, program, or process level. Security elements may have hierarchical deployment architectures that include any desired number of network elements, management elements, computing elements, programs, processes, and methods implemented in a physical and/or virtualized format. Examples of security elements may include a firewall appliance and its management element or software, anti-virus software and its management and update mechanisms, a vulnerability scanner, and/or a centralized public key infrastructure utilized for access or user entitlements.

Figure 2:
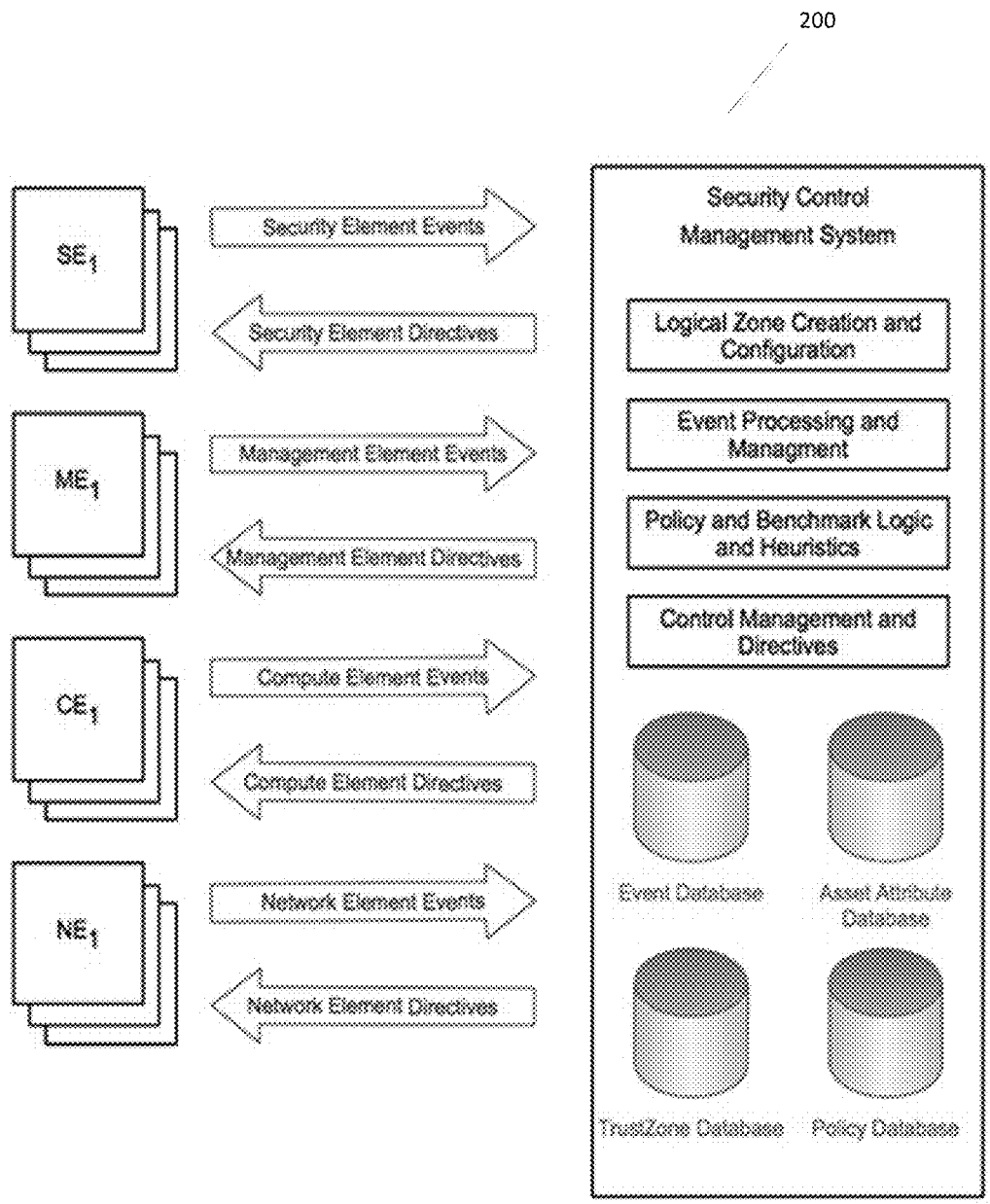
FIG. 2 depicts exemplary security control and management components according to various embodiments of the present disclosure.

FIG. 2 depicts components and programmatic inputs and outputs of a Security Control Management System (SCMS) 200 in accordance with an embodiment of the present disclosure. This embodiment may include various hardware and software components, software algorithms, data structures, and databases to implement various functions of the SCMS 200. Alternate SCMS's may have more, fewer, or different components and functionality.

In the exemplary embodiment depicted in FIG. 2, The SCMS 200 interacts with the computing environment through programmatic messaging mechanisms implemented via one or more standardized and/or proprietary interfaces or Application Programming Interfaces (APIs). The interface may utilize Secure Socket Layer (SSL) encryption, as well as any other desired encryption techniques to assure privacy and integrity of messages, events, directives and commands. Encryption techniques utilized by embodiments of the present disclosure may include mutual authentication for the sending and receiving elements. Programmatic messaging mechanisms may be implemented in any suitable manner by exemplary embodiments of the present disclosure such as via APIs, command line interface integrations, database queries, programmatic collection of display data (i.e., screen scraping), inter process communication methods, file system access, and others.

Through the programmatic messaging mechanisms, the SCMS 200 discovers information about the computing environment. Such information may include information related to individual elements, combinations of elements, or all elements. The discovered information may be used by the SCMS 200 for any desired purpose, such as to identify elements to be secured by the system and/or to heuristically determine element attributes for configuring security technical controls. The discovered information may also be used for evaluating compliance with governmental or industry regulations, security posture, security control function, security control efficacy, security control coverage, and/or security control operation.

The programmatic messaging mechanisms may include (where supported by the element or elements) the exchange between the element or elements and the SCMS 200, element related messages, logs, telemetry, configuration settings, data generated by programs or processes including or not including the SCMS 200, element attributes, data reflecting the current state and configuration of the element, and any other data relevant to the security technical controls, policies or benchmarks, either relative to the element itself or as available from the element or other elements in the computing environment, all of which may be collectively referred to herein as "events."

The programmatic messaging mechanisms may also include a command and/or configuration interface for reconfiguring the element in terms of configuration settings, policies, configuration files, the starting and stopping of element components including programs and processes, and/or to issue commands directly to the element for the purpose of changing the operational state of the element or to initiate reconfigurations performed through the same mechanism, all of which may be collectively referred to herein as "directives."

In the exemplary embodiment depicted in FIG. 2, the various components may include any desired combination of hardware and/or software components to perform various functions. For example, the Event Processing and Management component may normalize or transform such events for archiving and further processing by other components. Normalizations and transformations may include asset attribute substitution or addition through the addition of asset relevant identifiers for the purpose of associating the events with an information asset, the removal of data from the event for space reduction for archival purposes, the addition of attributes determined by the system to be relative to the originating element through events or algorithmic output from the system generated from events originating from other elements. Event processing may include extracting, from the event, streams of data and information relevant for the creation, maintenance and execution of policies, asset identification, configuration of security technical controls, and data relevant to the element and the state of the element relative to benchmarks or baselines consistent with and impacting the level of compliance with said benchmarks or baselines.

The Logical Zone Creation and Configuration performs the tasks related to TrustZone creation and configuration. This component deals with the mapping of information assets to logical zones (TrustZones) and provides the association of security technical control policies to the information asset.

The Policy and Benchmark Logic and Heuristics component performs the analysis of the policies and configurations of the security technical controls, relevant to and within the context of logical zones and the information assets within them within the context of the element events streams. This component measures data contained in events for the purpose of validating controls that are still in place and maps those control validations to various compliance frameworks such as PCI DSS 2.0, HIPAA, COBIT 4.1, DIACAP, and/or FISMA, as well as arbitrary frameworks, such as those devised at the discretion of an operator through the specification of various combinations of: policies, technical controls, asset attributes, required interactions with the SCMS verified by events, and/or attributes of elements of various types, such as those depicted in FIG. 1. This logic evaluates changes in security technical control configuration and asset attributes and performs security technical control policy reconfigurations based on those asset attribute changes for the purpose of maintaining the policy and application of the security technical controls and compliance with the benchmark. This logic evaluates various policy settings and takes the appropriate actions in response to asset attribute changes and asset TrustZone membership changes.

The Control Management and Directives component performs the construction of directives and initiates the delivery of directives to the computing environment elements to affect the appropriate action or actions from the elements including: the generation of events, transfer of configuration and process data in either direction, the starting and stopping of a security technical control, the reconfiguration of the security technical control with an updated policy, the reconfiguration of an element of any type, the starting and stopping of a program or process, the change of a configuration or attribute affecting a configuration, and the validation that the control is applied to any information asset as qualified by configuration data supplied through the events or directives.

The Event Database is a database used for the storage, retrieval, and management of events from any and all elements including the security control software itself. This database is used to store and subsequently query events for asset attribute data, security control configuration data, policy data and event data for the purposes of the various logic blocks and heuristics implemented in other components.

The Asset/Attribute Database is used for the storage, retrieval, and management of assets and asset attribute data. This database is used to store and subsequently query asset and asset attribute data for the purposes of the various logic blocks and heuristics implemented in other components.

The TrustZone Database is a database component used for the storage, retrieval, and management of logical zones (TrustZones). This component is used to store and subsequently query, update, modify TrustZones, information assets within a TrustZone, security technical control policies associated with the TrustZone for the purposes of the various logic blocks and heuristics implemented in other components.

The Policy Database is a database component used for the storage, retrieval, querying, and management of policies for the security technical controls, assets, software implementing embodiments of the present disclosure (or portions thereof), and the environment.

Figure 3:
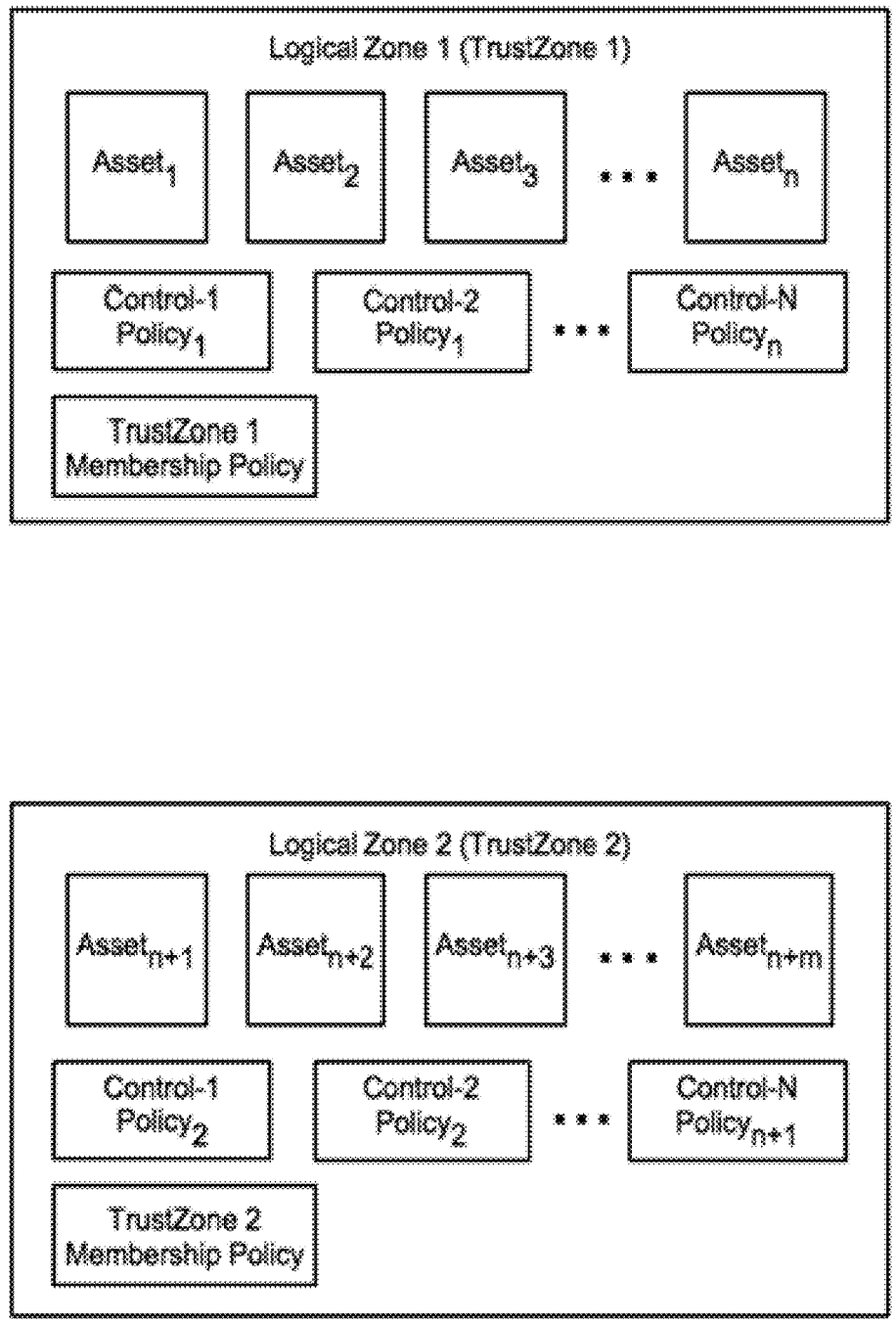
FIG. 3 depicts a logical representation of various logical zones according to various embodiments of the present disclosure.

FIG. 3 depicts the logical representation of Logical Zones, also referred to herein as TrustZones. This configuration construct, with its associated data structures, binds assets and groups of assets through the application of policies that dictate the function and behavior of the security technical controls. TrustZones can have arbitrary numbers of assets and security technical control policies. Different security technical controls may have policy constructs that allow for hierarchical or logical inheritance from/with other policies so the depiction of a Control-N policy represents the collection of all security technical control configuration policies, files, data, configuration settings that specify the specific operation of the security technical control at any time, stored as a unit for security technical control N.

Whereas the number of control policies may be contingent on the number of supported security technical controls, new controls may be integrated with embodiments of the present disclosure as such controls are developed and become available, and can result from the combination of control functional data and events from multiple security technical controls. Accordingly, the number of control policies may vary based on the security requirements for the computing environment and the technical security controls available and configured.

TrustZone membership policies may dictate how assets are automatically placed into one or more TrustZones based on asset attributes and events originating from any element as collected by the SCMS. Each asset can be assessed, as events indicating an asset attribute has changed are received by the security control software, within the context of all TrustZone membership policies so as to affect a TrustZone membership change by moving the asset from one TrustZone to another or adding the asset to another TrustZone.

Any combination and/or subset of the elements of the methods depicted herein may be practiced in any suitable order and in conjunction with any suitable system, device, and/or process. The methods described and depicted herein can be implemented in any suitable manner, such as through security control software operating on one or more computer systems, including host system 810 depicted in FIG. 8. The security control software may comprise computer-readable instructions stored in a tangible computer-readable medium (such as the memory 814 of host computer system 810) and can be executed by one or more processors (such as processor 812 of host computer system 810) to perform the methods of various embodiments.

Figure 4:
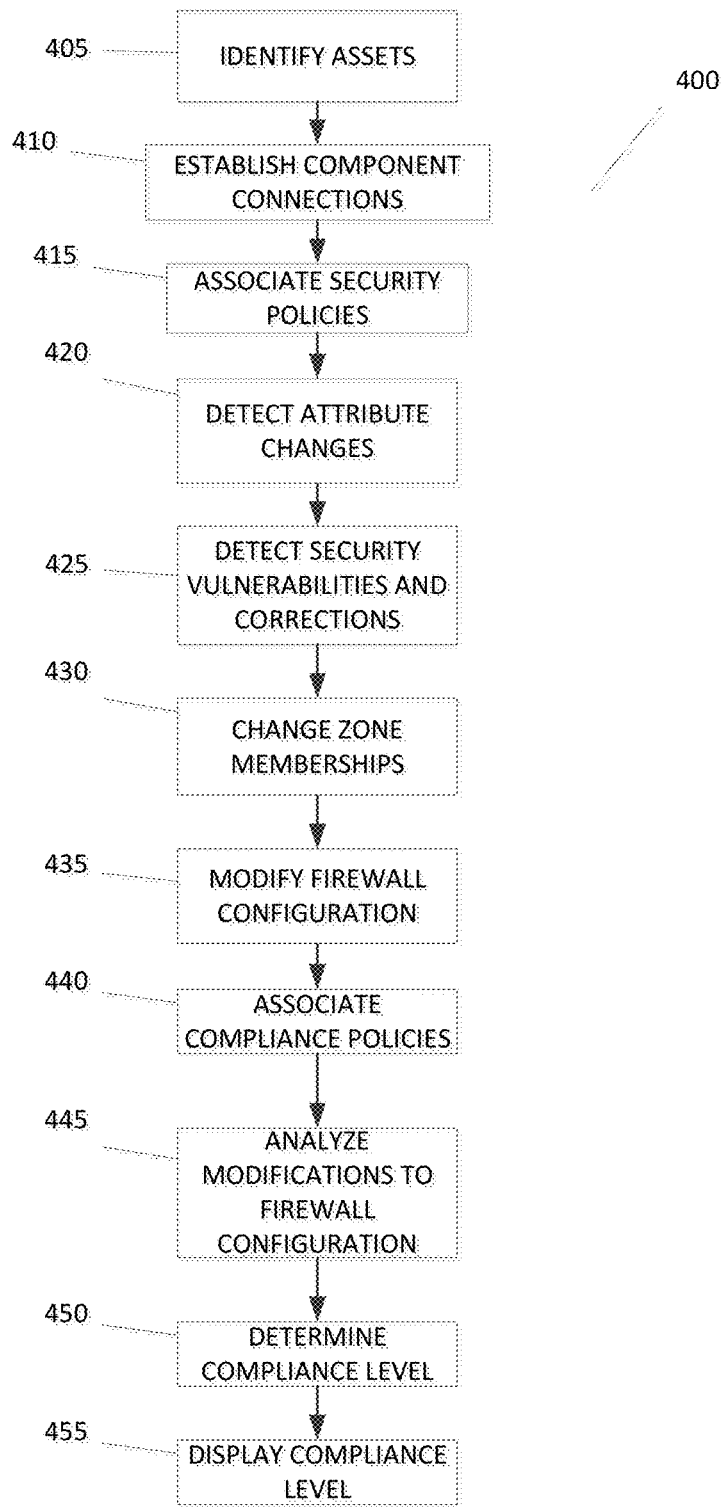
FIG. 4 is a flow diagram of an exemplary method according to various aspects of the present disclosure.

FIG. 4 depicts an exemplary process according to various embodiments of the present disclosure. In FIG. 4, method 400 includes identifying one or more assets associated with one or more logical zones (405), establishing connections with one or more components (410), associating one or more security policies with one or more logical zones (415), detecting changes in one or more attributes for one or more assets (420), detecting security vulnerabilities and corrections thereto (425), changing zone memberships for one or more assets (430), modifying one or more firewall configuration settings (435), associating one or more compliance policies with one or more logical zones (440), analyzing modifications to the firewall configuration settings (445), determining one or more compliance levels (450), and displaying one or more compliance levels (455). The steps of method 400 may be implemented (in whole or in part, and in any desired order) by software operating on a computer system, such as the exemplary host computing system 810 depicted in FIG. 8.

Embodiments of the present disclosure may identify any number of different assets (405) associated with any number of different logical zones, such as the assets in Logical Zones 1 and 2 depicted in FIG. 2. As discussed above, such assets may include any combination of physical and virtual components.

Connections may be established (410) with any number of different software and hardware components. Embodiments of the present disclosure may operate in conjunction with various programmatic messaging mechanisms that help bind the SCMS with the security technical controls within the environment. The logical zones, or TrustZones, may be created in any suitable manner, such as through interactions with logical components not depicted, policies placed on one or more logical zones that are relevant to the security technical controls bound to the SCMS.

Computing environment events may be received via programmatic messaging mechanisms that provide various information about the environment, including the assets to be protected by the security technical controls and/or the state of the security technical controls. Connections between the security control software and various components (such as management components) may be made to send and receive information, detect changes in the attributes of various assets, and to control and configure various systems, such as a firewall protecting one or more assets or logical zones.

In one embodiment, security control software implementing features of the present disclosure establishes connections via programmatic messaging mechanisms (as described above) between itself and the management element or asset management component of a virtualized infrastructure, such as a VMware vSphere server, and between itself and the management element for a virtualized firewall implemented on the same virtualized infrastructure, such as a VMware vCNS App firewall. Changes in an attribute of an asset may be detected via a communication with the management element and the security control software.

Assets, and changes in the attributes of assets, may be detected by periodically querying the management element or other hardware or software components. For example, a security technical control, referred to herein as a Virtual Infrastructure Monitor (VIM), may use the connection to the vSphere server to identify and enumerate all virtualized computing elements (i.e., virtual machines) and all virtual switches. Through the API interface with vSphere, the security control software implementing the features of the present disclosure may periodically query and re-enumerate the configured virtual machines and virtual switches, thus determining the creation of new assets (such as virtual machines and virtual switches) or changes to the attributes of existing assets by comparing the results of subsequent queries with the previous query. The attributes for a plurality of different assets controlled by an asset management component can be monitored by querying the asset management component, as well as via communications originated by the asset management component to the security control software.

The VIM is also capable of querying various virtual machine configurations and settings such as the virtual infrastructure Universally Unique Identifier (UUID) for the virtual machine, the virtual network interface cards, virtual machine interface card Internet Protocol (IP) address, current position of the virtual machine interface card within the virtual switch or switches, and many more configuration settings, which may be referred to herein collectively as "attributes of the virtual machine." Through the processing of events generated by VIM, the SCMS "incepts" each virtual machine as an information asset within the SCMS, storing the asset data including attributes in the Asset/Attribute database.

In the present exemplary embodiment, the availability of a management element that provides the API interface to enumerate assets and asset attributes makes this process programmatically simplified when the computing environment includes a predominantly virtualized infrastructure. Alternate embodiments could collect and/or create the same or similar data relative to physical computing elements through the establishment of programmatic messaging mechanisms with a variety or combination of management elements, other technical security controls (such as network scanners), and with the physical computing elements themselves. Thus, embodiments of the present disclosure may operate with any combination of physical and virtual components.

The system may instantiate another connection with the management element for the virtualized firewall (i.e., a firewall management component) implemented on the same virtualized infrastructure. This connection need not necessarily include a technical security control in of itself, but rather a programmatic interface to the firewall (a technical security control). The functionality of the firewall can be managed via a communication between the security control software and the firewall management component. In exemplary embodiments, the programmatic interface or API enables the SCMS to fully control the firewall, the firewall operation and firewall policies expressed in configuration settings and access control lists (ACLs), through a combination of issued directives and collected events to and from the firewall management element. This connection and API constitutes an orchestrated security technical control relative to the SCMS.

Various security policies may be associated with different assets and/or logical zones (415) in any suitable manner. For example, an operator of the SCMS, as well as the software control software itself, may create and configure various logical zones, and security policies for such zones, expressed as a sequence of rules. In one exemplary embodiment, the rules may have the form:

Source_TrustZoneA Destination_TrustZoneB protocol port [allow,deny]

In this example, each rule is a Zone Access Control rule, and the set of all configured Zone Access Control rules may be referred to herein as a Zone Access Control List or ZACL. In the example above, the source TrustZone is named TrustZoneA and the destination TrustZone is named TrustZoneB. By providing this abstraction, embodiments of the present disclosure help to simplify the management of what are known to practitioners of network security as Access Control Lists, which typically consist of source and destination IP addresses. While complex and disassociated asset attributes like IP address are used within conventional ACLs, in the ZACLs utilized by embodiments of the present disclosure, the source and destination are logical zones which have human readable names that are more identifiable relative to the information the assets in the ZACLs are protecting with the firewall security technical control. Referring again to FIG. 3, each TrustZone may be associated with a policy (415) for the firewall security technical control as the TrustZone is placed in the ZACL (e.g., via adding a Zone Access Control rule containing the TrustZone to the ZACL), whereby changes in the configuration to the firewall are performed in accordance with the policy. The security policy can also be edited or replaced for any TrustZone already placed in the ZACL, by for example, modifying the Zone Access Control rule.

The security control software can monitor changes (420) for all virtual machines and physical components within one or more logical zones. Event data may be analyzed and processed, and security technical controls configured or reconfigured (435) via the modification of policies. Modification of the configuration settings for the firewall may be made based on a change in a single attribute of a single asset, as well as based on an analysis of multiple attribute changes for multiple assets. For example, referring again to FIG. 3, in a case where the logical zone memberships for an asset in Logical Zone 1 and an asset in Logical Zone 2 are swapped, the security control software may analyze the change in zone membership for both assets and make a single change to the configuration settings for the firewall in accordance with the analysis. Among other things, considering multiple attribute changes (such as the swap in zone membership above) together can help embodiments of the present disclosure avoid repetitive and spurious modifications to the firewall.

Continuing with the example above, when an operator or software places an asset (Asset1) into TrustZoneA the security control software detects the change in the attributes of the asset (420), namely the change in TrustZone membership, and modifies the firewall configuration (435) accordingly. In this example, as a result of the TrustZone change, the security control software evaluates the asset attribute IP address for Asset1 and then implements an ACL on the firewall in the firewalls native form (ACL), through a formulated directive to the firewall. If a second asset (Asset2) is placed into TrustZoneB, the security control software detects the change (420), evaluates the asset attribute IP address for Asset2, and then implements an ACL on the firewall (435) in the firewall's native form (ACL) through a formulated directive to the firewall. At this point, assuming it is desired that all Transmission Control Protocol (TCP) connections between TrustZoneA and TrustZoneB be denied, the native firewall rule (ACL) may appear as:

Asset1_IP_address Asset2_IP_address TCP any deny
And the ZACL may appear as:
TrustZoneA TrustZoneB TCP any deny For each asset added to either TrustZoneA or TrustZoneB, the system may continue building the native firewall ACL through subsequent directives, configuring the firewall automatically as the operator populates the TrustZones with assets.

Embodiments of the present disclosure may operate to detect any desired change in the attributes of an asset, such as the asset's internet protocol (IP) address. For example, if a Dynamic Host Configuration Protocol (DHCP) IP address lease expires and Asset1 receives a different IP address upon renewal of the lease; or Asset1 receives a different IP address through DHCP after being powered off for a period of time; or a hacker changes the IP address in an effort to bypass the network access controls; or an administrator accidently assigns the wrong IP address (mis-typing)—in all cases, the IP address of Asset1 changes. Because the security control software of the present disclosure is monitoring the asset attributes of all assets (e.g., through VIM), when an asset attribute change is detected (420), the security control software can formulate and send a directive (435) to modify the ACL on the firewall to reflect the new IP address.

Now consider a third TrustZone, TrustZoneC, from which the operator wants to allow all TCP connections to TrustZoneB. The ZACL for these policies would look like this:

TrustZoneA TrustZoneB TCP any deny
TrustZoneC TrustZoneB TCP any allow

In an example using these TrustZones, consider that, as a result of an architectural change, Asset1 (currently in TrustZoneA) now needs to be allowed to make any TCP connection to Asset2 (currently in TrustZoneB). Asset1 can be moved from TrustZoneA to TrustZoneC. The system, through it's monitoring of the asset attributes, detects the move (420) and can formulate a directive to the firewall (435) to remove Asset1's IP address from the deny ACL and add Asset1's IP address to the allow ACL. This may result in completely changing the firewall policy for both Asset1 and Asset2, and can be performed automatically, with minimal operator effort, and without the need to manipulate complex numerical ACLs on the firewall. In this manner, the configuration settings of the firewall can be modified in response to detecting the move an asset from one logical zone to another to allow or prevent communication between the moved asset and another asset or component.

Among other things, logical zoning with TrustZones helps maintain, for the security technical control firewall, the policy and the integrity of the policy when asset attributes that impact the operation of the firewall are changed for natural, accidental, or malicious reasons. Additionally, embodiments of the present disclosure are equally effective in reconfiguring the settings of a firewall when an asset (such as a physical hardware component) physically moves locations, or is simply reassigned from one logical zone to another without physically moving the asset. Furthermore, the movement of virtualized assets between the management of one management element to another management element (e.g., a vMotion event, or migration from one virtual infrastructure to another) can be tracked, as may the location of physical assets, via the connections between the security control software and various asset management components.

Embodiments of the present disclosure can move an asset (i.e., change its logical zone membership) from one TrustZone to another (430) as desired, such as when the asset attribute VM name changes. In other embodiments, different attributes or combinations of attributes for the asset, other assets, or any element could be monitored for change and affect the same TrustZone change behavior for an asset. Accordingly, as illustrated above, the firewall policy may be maintained or changed (in whole or in part) based on the nature of the attribute changes detected by the security control software implementing features of the present disclosure.

Embodiments of the present disclosure have significant utility when considering asset attributes derived from the operation of other security technical controls like a vulnerability scanner or malware detection. New vulnerabilities and viruses are constantly being discovered, so the embodiments of the disclosure can help facilitate pre-planning and pre-configuration of counter measures for these events by allowing the architect to configure TrustZones with more limited network access or no network access at all.

Referring again to FIG. 4, upon detection of a security vulnerability (such as a virus or other malware, or a defect in hardware or software) on an asset (425), security control software of the present disclosure could automatically limit or terminate network access by moving the asset (430) to a predefined TrustZone until other automated security technical controls update the vulnerability software or remove the virus. Such quarantine could be automatically removed in response to detecting the asset attribute condition that initiated the automated movement of the asset being cleared (420), or from the security control software receiving another indication that the security vulnerability has been addressed. Once the security vulnerability is addressed, the asset may be automatically moved back to the original TrustZone and the original network access policies (as expressed in the ZACL) automatically restored.

For various compliance frameworks, the security control software of the present disclosure may perform a logical mapping between the compliance controls in the framework and various security technical controls (technical controls). Administrative controls may also be mapped to the compliance controls in the frameworks, through (for example) events that are generated by the security control software and that indicate the completion of specific operator interactions with the security control software, that indicate the completion of a workflow (a process or procedure that must be completed), and/or that meets the administrative control as defined in the framework. This mapping is referred to as a compliance mapping and, in one embodiment of the disclosure, is implemented within the Policy and Benchmark Logic and Heuristics components, and the Policy Database (see FIG. 2).

Referring again to FIG. 1, one or more compliance control policies may be associated with one or more logical zones and/or assets (440). When the technical controls required by the compliance control are validated as being place for an asset in a logical zone, the security control software, using the compliance mapping, may adjust the compliance level for that compliance control accordingly.

For security technical controls, the validation of the application of the security technical control to any one asset may be performed by the security control software of the present disclosure based on the logical zoning mechanisms and membership in a TrustZone with the appropriate policies for the security technical control as described above for firewall. Any additional security technical controls may be validated as well (e.g. IPS, Vulnerability Scanner, flow auditing), such as through various interactions with the management elements for various technical controls.

For administrative controls, SCMS events that indicate that a sequence of operations invoked by the operator within the security control software's user interface have been completed validate that the administrative control has been satisfied. An example of an administrative control is the production and sharing of reports. In such an example, the operator schedules a report and designates a contact list to receive the report. Upon completion of the scheduling, an event is generated indicating the report is scheduled for delivery, thus satisfying any administrative control that requires the collaboration or sharing of information contained in any report available. Alternate embodiments could implement events for any sequence of interactions (e.g. Configuration Wizards) for any process or procedure and validate any number of processes and procedures related to the operation and configuration of the security technical controls, administrative controls, management elements, security elements, network elements, and computing elements in the computing environment, thus providing validation of compliance controls that are procedural in nature.

When adherence to a particular compliance framework is desirable, the operator can, through the Logical Zone Creation and Configuration components (see FIG. 2), select a compliance framework for any TrustZone or TrustZones. Once a compliance framework setting is applied to a Trust-Zone, the policies and configurations of all technical security controls and performed administrative controls are evaluated within the context of the compliance mapping for the compliance framework selected.

The security control software may analyze one or more modifications to the firewall configuration settings (445). As each control is configured, the security control software, using the compliance mapping, generates a compliance level (450) for each compliance control that is supported by the security technical controls and administrative control sequences.

Compliance mappings may combine validated technical controls where information from one technical control or policy is not sufficient to assure compliance with compliance controls. For instance, in the above example, the firewall implementation of the access control, the ACL, is only sufficient to assure the asset is protected by the firewall, when the asset attribute IP address remains the same as the one configured in the firewall ACL. Examples above demonstrate that for any asset, the attribute IP address can and will change. Through the combination of the VIM control that monitors the asset attribute changes for virtualized information assets (VMs), including asset attribute IP address changes, the compliance mapping (which combines these controls for this purpose) of the present disclosure provides more robust assertion of compliance, than conventional methods of monitoring of the firewall ACLs alone. This specific combination of the VIM control and the firewall can be generalized to any combination of VIM with any network security technical control that depends on the asset attribute IP address to function correctly. The combination of different technical and administrative security controls can be further generalized to improve the assertion of compliance controls through, for example, the use of logical zoning that allows for the application and validation of multiple security control policies in a validated manner.

Figure 5:
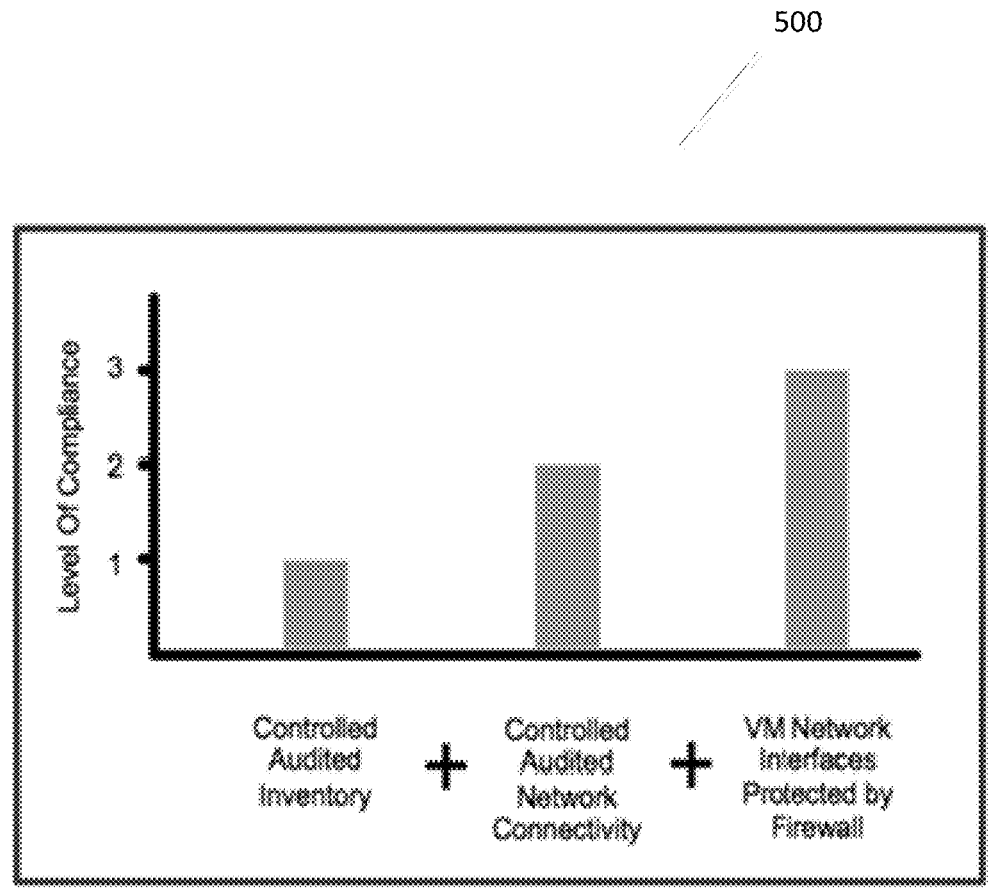
FIGS. 5-7 illustrate the calculation and display of compliance levels according to various aspects of the present disclosure.

As described above, embodiments of the present disclosure may update policies for firewalls automatically in response to IP address changes, thus maintaining compliance. This scenario illustrates why evaluating multiple technical controls may sometimes be desirable to help maintain compliance with compliance frameworks, and demonstrates the advantageous capabilities of the embodiments of the present disclosure. Although this example of combined security technical control for compliance mapping utilizes only two security technical controls, the number of security technical controls and/or events that may be combined for compliance mapping is not bounded, and combinations of arbitrary numbers may be utilized in embodiments of the present disclosure. In FIG. 5, for example, chart 500 illustrates three technical controls along the x-axis, with the contributed level of compliance to a compliance control along the y-axis.

Figure 7:
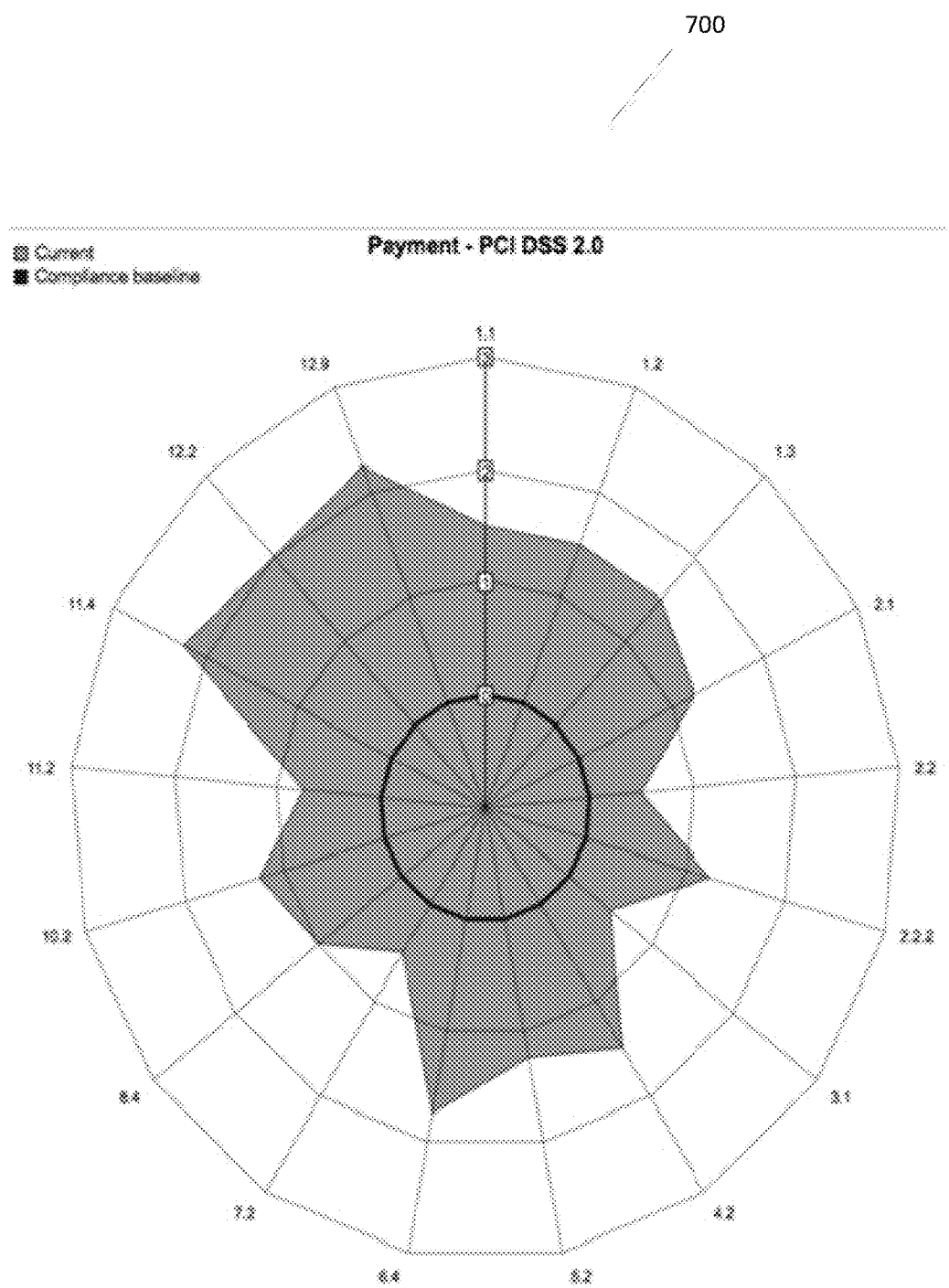

The application of firewall controls as described above may be validated by the logical zoning for any asset in a TrustZone with a ZACL listing. For any compliance control that requires the implementation of network base access controls enforced by a firewall, the security control software may utilize the instantiated compliance mapping in combination with other validated security technical controls to calculate the current compliance level for each supported compliance control. Each security technical control in a combination, as expressed in the mapping, may contribute a normalized portion of a defined compliance level measurement. These levels may be represented numerically, such as a level between 0 and 3, and that level displayed graphically (455) in real time or near-real time as shown in FIG. 7. Compliance levels (such as numerical scores) may be generated for any number of logical zones, assets, or other hardware and software components (such as the firewall) and may be simultaneously evaluated against multiple compliance frameworks through alternate compliance mappings.

Compliance frameworks are generally configured to protect data, such as cardholder data in the case of the Payment Card Industry (PCI) Data Security Standard. Generally, the number of individual elements in the computing environment that process data subject to any compliance framework is greater than one and is typically many. The sum total of all elements or assets that process the data subject to a compliance framework is referred to as the compliance scope. The compliance level of the computing environment, relevant to any framework, may only be as high as the level measured on the least compliance asset within the compliance scope. Logical zoning supports the inclusion of multiple information assets in any TrustZone. For any TrustZone with a compliance framework set, the security control software measures the compliance level for all supported compliance controls, for every asset within the TrustZone. The aggregate TrustZone level of compliance as displayed for any compliance control is calculated as the lowest measured compliance level for all assets within the TrustZone.

Figure 6:
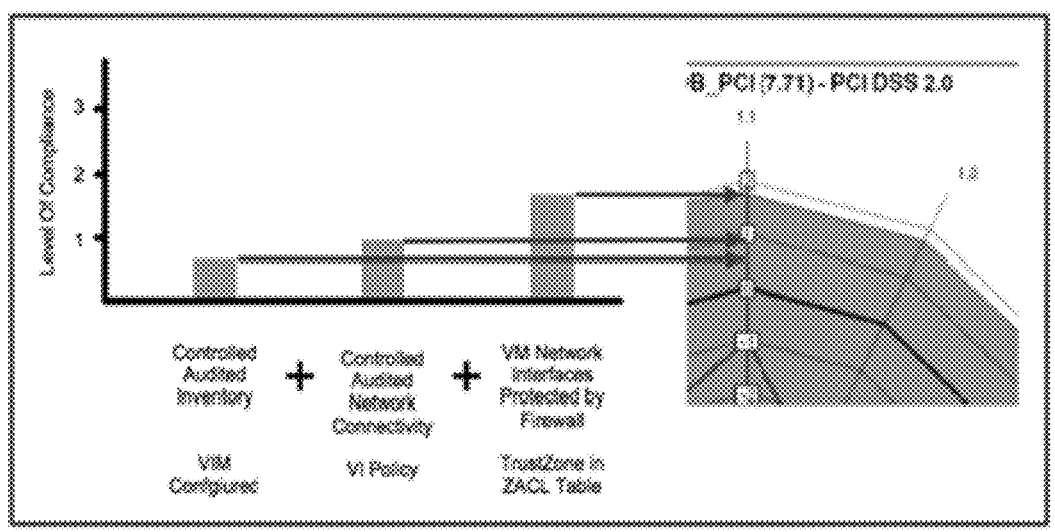

FIGS. 6 and 7 illustrate how an exemplary embodiment of the present disclosure, using a radial chart format, displays the compliance level for multiple compliance controls (455). In this example, the chart displays compliance for the PCI DSS 2.0 framework, but compliance levels may be graphically depicted for any number of different compliance standards in the same or different graphs.

With the radial chart 700 in FIG. 7, the aggregate compliance level for all compliance controls is displayed for all assets in a TrustZone named "Payment" based on calculation method described above. For each compliance control, the calculated compliance level is displayed as a radial element of the radial chart and is identified with the section number from the compliance framework.

Embodiments of the present disclosure may contain multiple compliance mappings for which the compliance levels for each TrustZone are calculated and displayed based on the specific and unique compliance framework set for that TrustZone. For example, a computing environment may contain data subject to multiple compliance frameworks. Among other things, logical zoning with TrustZones allows for the grouping of assets based on these compliance frameworks and the reporting of the compliance levels for those specific and distinct frameworks simultaneously, including the ability to measure compliance levels for an asset within the context of multiple compliance frameworks through the process of adding that asset to multiple TrustZones with different compliance framework settings.

Figure 8:
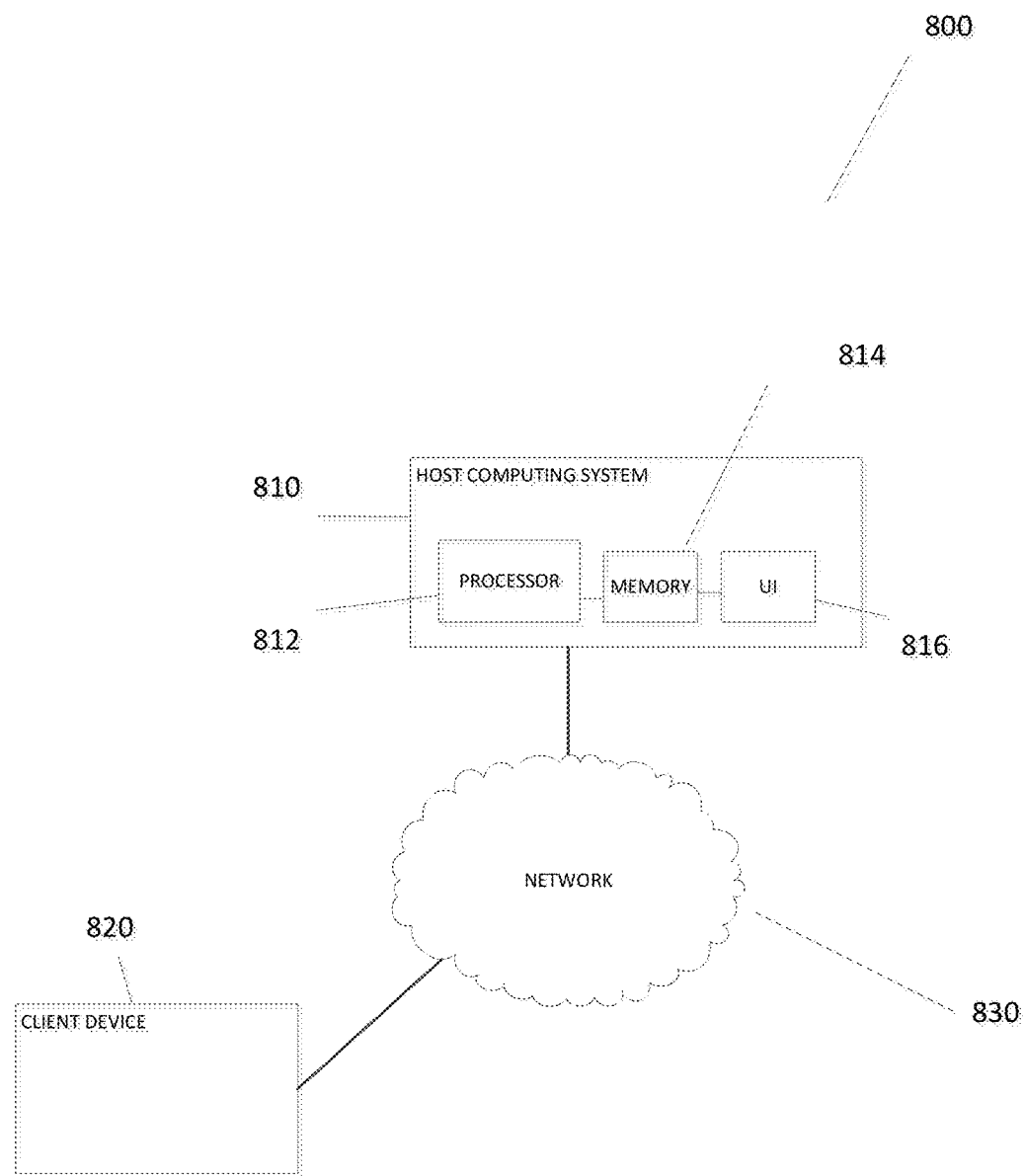
FIG. 8 is a block diagram of an exemplary system according to various aspects of the present disclosure.

FIG. 8 shows a block diagram of system which may be used in conjunction with various embodiments. While FIG. 8 illustrates various components of a computer system, it is not intended to represent any particular architecture or manner of interconnecting the components. Other systems that have fewer or more components may also be used.

In FIG. 8, the system 800 includes a host computer system 810 comprising a processor 812, memory 814, and user interface 816. Host computer system 810 may include any number of different processors, memory components, and user interface components, and may interact with any other desired systems and devices in conjunction with embodiments of the present disclosure.

The functionality of the host system 810, including the method depicted in FIG. 4, (in whole or in part), may be implemented through the processor 812 executing computer-readable instructions stored in the memory 814 of the system 810. The memory 814 may store any computer-readable instructions and data, including software applications and embedded operating code.

The functionality of the host system 810 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 812 retrieves and executes instructions stored in the memory 814 to control the operation of the system 810. Any type of processor, such as an integrated circuit microprocessor, microcontroller, and/or digital signal processor (DSP), can be used in conjunction with embodiments of the present disclosure. A memory 814 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 814 in any desired manner.

The host system 810 includes a user interface 816 may include any number of input devices (not shown) to receive commands, data, and other suitable input from a user, as well as any number of output devices (not shown) to provides the user with data, notifications, and other suitable information. Typical I/O devices may include mice, keyboards, modems, network interfaces, printers, scanners, video cameras and other devices.

The host system 810 may communicate with one or more client devices 820 and other systems and devices in any desired manner, including via network 830. The client device 820 may include any computing device that operates in conjunction with systems and methods of the present disclosure. The client device 820 may be, or include, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 8300 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, pervasive computers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

Various embodiments may operate in conjunction with any suitable operating system (e.g., Windows NT, 95/98/2000/CE/Mobile, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

Various components, modules, and/or engines may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems may utilize TCP/IP communications protocols as well as IPX, Appletalk, IP-6, NetBIOS, OSI, any tunneling protocol (e.g. IPsec, SSH), or any number of existing or future protocols. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that the network may be implemented as other types of networks, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
   identifying virtual machines in a virtualized infrastructure, the virtual machines organized into groups, wherein each of the virtual machines is associated with a policy;
   monitoring the virtual machines; and
   in response to the monitoring, applying a first policy to a first virtual machine in a first group of the virtual machines, wherein applying the first policy comprises modifying a firewall configuration by changing an access control rule associated with the first virtual machine.

2. The method of claim 1, wherein the first policy is associated with the first group.

3. The method of claim 1, further comprising applying a second policy to the first virtual machine, wherein the second policy is associated with a second group of the virtual machines.

4. The method of claim 1, further comprising:
   associating compliance policies with the virtual machines;
   validating a compliance control for the first virtual machine; and
   in response to the validating, adjusting a compliance level for the first virtual machine.

5. The method of claim 4, further comprising displaying the compliance level.

6. The method of claim 1, wherein applying the first policy further comprises issuing directives and collecting events to and from a firewall management element.

7. The method of claim 1, wherein applying the first policy comprises modifying a configuration of the first virtual machine.

8. The method of claim 1, wherein the monitoring detects a security vulnerability of the first virtual machine, and the applying the first policy to the first virtual machine comprises changes the access control rule for the first virtual machine.

9. The method of claim 1, wherein the monitoring is performed by a computing device, and the first policy is a policy associated with a control configured by the computing device for at least one of the virtual machines.

10. The method of claim 1, wherein the applying the first policy comprises terminating network access by the first virtual machine to any other of the virtual machines.

11. The method of claim 1, wherein the monitoring detects a change in an IP address of the first virtual machine.

12. The method of claim 1, wherein the monitoring comprises receiving a unique identifier from each of the virtual machines.

13. The method of claim 1, wherein the first policy comprises a plurality of access control rules, the first group is associated with other policies in addition to the first policy, and wherein the other policies are applied to each of the virtual machines in the first group.

14. The method of claim 1, wherein the monitoring comprises collecting events originated from the first virtual machine.

15. A method, comprising:
    associating a policy with a first group;
    monitoring a plurality of virtual machines in a virtualized infrastructure, wherein the plurality of virtual machines includes a first virtual machine that is a member of the first group;
    detecting, based on the monitoring, a modification associated with the first virtual machine;
    in response to detecting the modification, changing the policy associated with the first group; and
    applying the changed policy to the first virtual machine, wherein the modification comprises a change in an access control rule for the first virtual machine.

16. A method, comprising:
    storing data regarding a plurality of groups, each group associated with a subset of a plurality of virtual machines, the data further regarding a first virtual machine associated with a first group of the virtual machines, and the data comprising attribute data for the first virtual machine;
    monitoring the plurality of virtual machines; and
    in response to the monitoring, changing a first policy for the first virtual machine that modifies the association of the virtual machine with the first group, including a change in an access control rule for the first virtual machine.

17. The method of claim 16, further comprising updating an attribute of the first virtual machine so that a policy associated with a second group of the virtual machines is automatically applied to the first virtual machine.

* * * * *